Patented Feb. 15, 1944

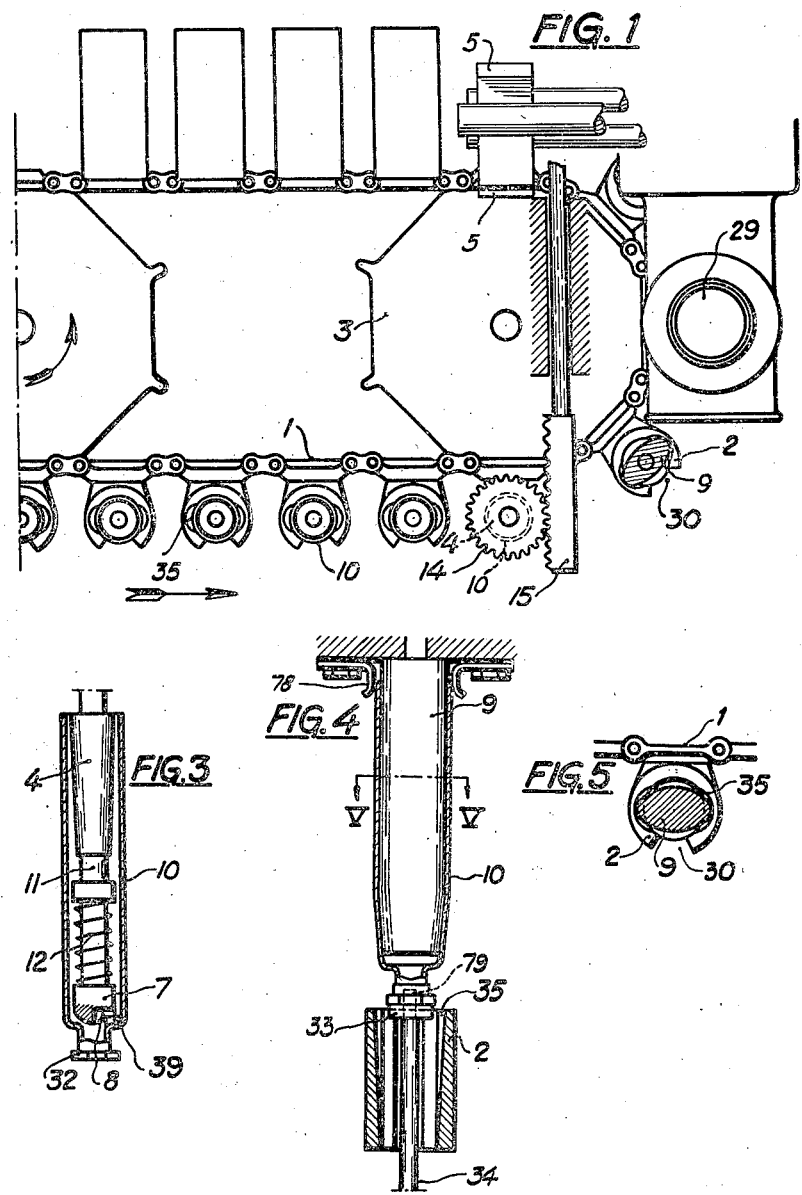

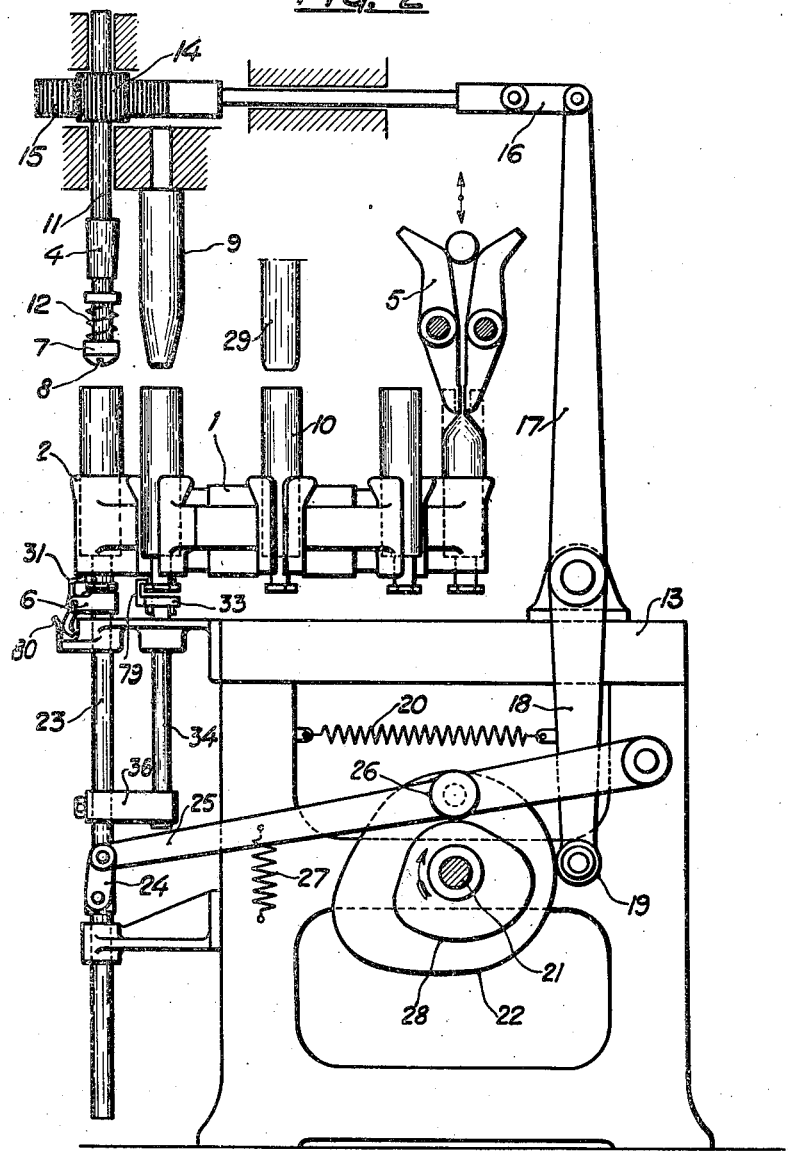

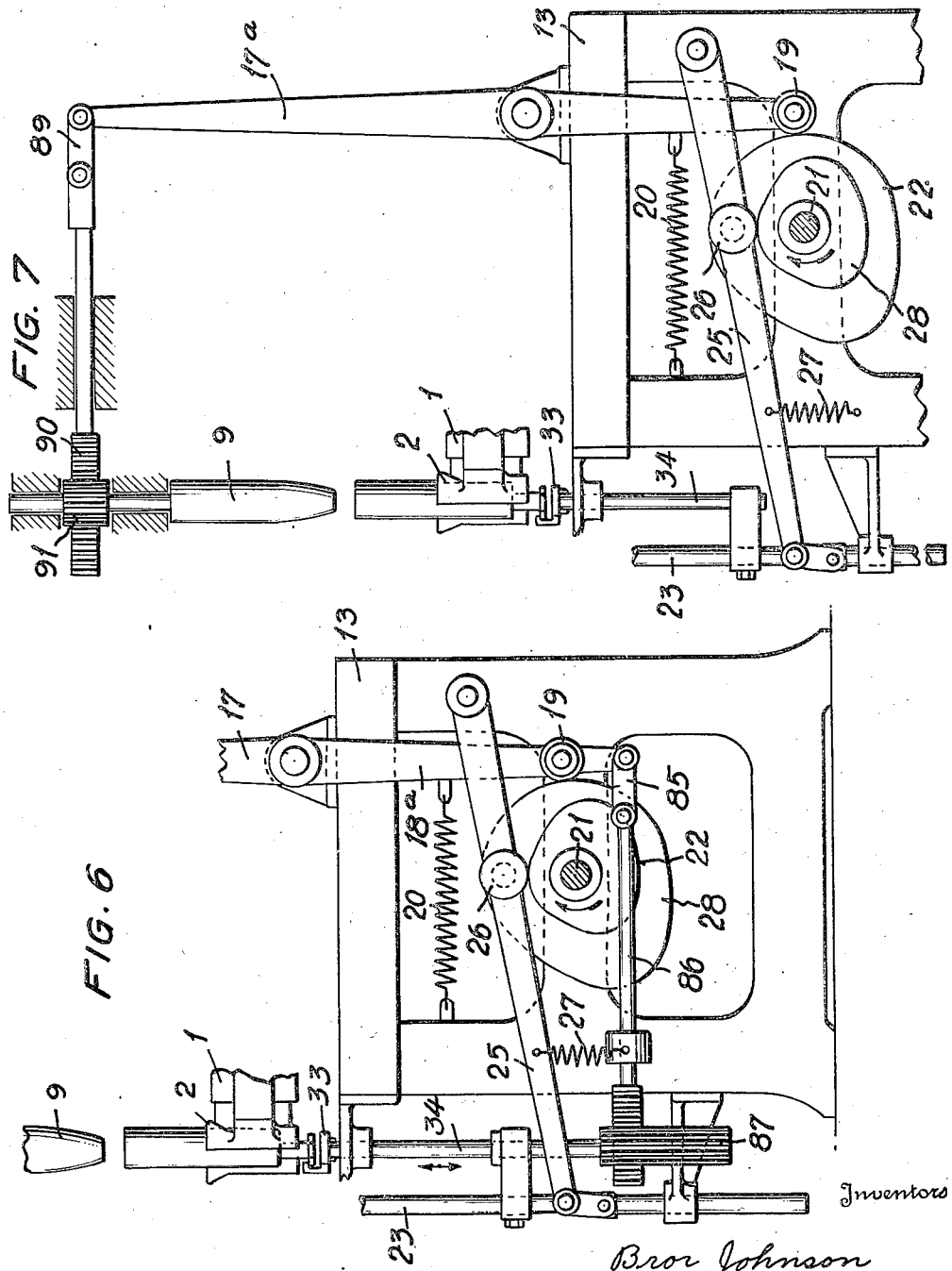

2,341,554

UNITED STATES PATENT OFFICE 2,341,554

APPARATUS FOR SEALING COLLAPSIBLE TUBES

Bror Johnson, Alsten, Sweden, and Thomas Fenwick, Heston, England, assignors to Aktiebolaget Gerh, Arehns Mekaniska Verkstad, Stockholm, Sweden, a joint-stock company of Sweden Application May 20, 1939, Serial No. 274,844
In Sweden May 25, 1938

2 Claims. (Cl. 113—1)

This invention relates to a method of and apparatus for sealing collapsible tubes. In the manufacture of sealed collapsible tubes the open-ended tubes are placed manually into pockets of a conveyor which moves them stepwise to a filling device and further to a mechanism for sealing the ends of the tubes. As a rule, such tubes have stamps, labels or other designs applied to them. Particularly if the tubes are sealed by flattening their open ends it is necessary that the seal be applied to the tube in a correct position relative to said design, etc., as otherwise the appearance of the finished tube will be unattractive. To obtain a correct position of the seal the tubes may be positioned very carefully into the conveyor pockets or they may be turned automatically into correct position with respect to their designs, etc., after they have been introduced into the conveyor pockets, but such provisions do not insure that the tubes will reach the sealing mechanism in a correct position with respect to their designs, etc. Thus it might occur that, due to vibrations of the machine, the tubes turn within the conveyor pockets, whereby an initially correct positioning or correction of position will be disturbed. This inconvenience will arise particularly if the open ends of the tubes project far beyond the pockets.

It is an object of our invention to make provision for removing said drawback and to this end the softness of the material of which the tubes are made is utilized. Another object of the invention is to remove said drawbacks by provisions that facilitate sealing of the tubes by flattening their ends. Still another object of the invention is to provide simple and efficient means for screwing a cap tightly to the opposite ends of the tubes.

In the drawings illustrating an embodiment of the invention—

Fig. 1 is a plan view and Fig. 2 is an elevational view of the apparatus;

Figs. 3 and 4 are elevational views, partly in section, of parts of the apparatus enclosed by a tube, the latter being shown in longitudinal section;

Fig. 5 is a sectional view taken on the line V—V of Fig. 4;

Fig. 6 is a somewhat diagrammatic elevational view of mechanism for screwing the cap on the tube by rotating the cap, certain parts being omitted for simplicity of illustration; and Fig. 7 is a view similar to Fig. 6 of mechanism for screwing the cap on the tube by rotating the tube.

Referring to the drawings, an endless chain conveyor 1 is provided with vertical open-ended pockets 2 for carrying the tubes 10. The pockets 2 have longitudinal slots 30 and interiorly they have a substantially oval cross-sectional shape inasmuch as they have each two oppositely disposed recesses 35 which taper downwardly. The conveyor 1 runs over sprocket wheels 3 which rotate stepwise so that the conveyor at each movement advances one step in the direction of the arrow (Fig. 1), each step corresponding to the distance between the centers of two adjacent pockets 2. Above the path of travel of the pockets 2 there is provided an adjusting member 4, a device 29 for filling the tubes with paste or other material and tongs 5 for closing and sealing the upper ends of the tubes. Below the conveyor 1 opposite to the adjusting member 4 is provided an elevator member 6 which has a hook 31 actuated by a spring (not shown) to be swung inwardly into engagement with the necks of the tubes 10 and adapted periodically to engage an abutment 80 to be swung outwardly.

The adjusting member 4 is provided with a driving head 7 having a notch 8 adapted to register with an inner projection 39 of the tube 10. The driver 7 is axially displaceable but non-rotatably mounted on a spindle 11 of the adjusting member 4 and is urged downwardly by a spring 12. The spindle 11 is rotatably journalled but axially immovable in the machine frame 13. It is keyed to a gear wheel 14 which meshes with a rack 15 which is axially displaceable in the frame 13. One end of the rack 15 is connected by means of a link 16 to one arm 17 of a double-armed lever the other arm 18 of which carries a roller 19 which is pressed by a spring 20 against the periphery of a cam disc 22 keyed to a continuously rotating driving shaft 21. The member 6 is mounted on a spindle 23 which is connected to a lever 25 by means of a link 24. The lever 25 is provided with a roller 26 which is pressed by means of a spring 27 against a cam disc 28 keyed to the shaft 21.

Above the tube conveyor 1 in sequence to the adjusting member 4 there is secured to the frame 13 a mandrel 9 which has an oval cross section the periphery of which is slightly less than that of the tubes 10. As shown in Figs. 1 and 5 the angular position of the mandrel 9 is such that its cross section will substantially coincide with the inner cross section of an underlying pocket 2 when viewed longitudinally of the mandrel and pocket. Thus if the mandrel 9 were movable downwardly it would be able to enter a pocket 2 directly as the major axis of the cross section of the mandrel 9 as well as that of the underlying pocket 2 are parallel. Therefore, the mandrel may be associated with means for periodically entering a tube positioned within a pocket below the mandrel. Thus the mandrel may be connected to driving means of the kind described in the Patent No. 2,104,485, granted to Johnson, which means is adapted to displace an adjusting member vertically. But in the embodiment now described the mandrel 9 is assumed to be positioned stationarily above the pocket 2 (Fig. 1) that has been arrested at a position between the adjusting device 4 and the filling device 29. Below the mandrel 9 is provided an elevator member 33 which has a hook 79 and is mounted on a rod 34. The rod 34 is movable vertically in the machine frame 13 and it is rigidly connected to the spindle 23 by means of a bracket 36.

In operation, the open-ended empty tubes 10 are placed manually in succession into the pockets 2 and moved stepwise in the direction of the arrow (Fig. 1). When a tube has reached the position below the adjusting member 4 the elevator member 6 raises the tube and puts it around the adjusting member, so that the driver 7 presses against the projection 39 of the tube. Thereafter or simultaneously the adjusting member is caused to revolve through a predetermined angle or a predetermined number of revolutions (conveniently one complete revolution) which is effected by swinging the lever 17, 18 thus moving the rack 15. The driver 7 will be coupled to the tube when the notch 8 is opposite to the projection 39 of the tube. On the continued angular movement of the adjusting member the latter will turn the tube into a predetermined angular position, from which position it is turned back into the initial position of the adjusting member. This returning movement is effected by the rack 15 being retracted to drive the adjusting member 4 in a reverse rotary direction. After thus having reached a correct angular position the tube 10 is again moved down into the pocket 2 under the pulling action of the hook 31 embracing the cap 32 of the tube until the hook hits the abutment 80 and is thereby swung out of engagement, whereafter the tube is moved by the conveyor 1 into a position opposite to and below the mandrel 9. Simultaneously as a subsequent tube is raised to be put around the adjusting member 4 the elevator member 33 raises the tube which has just been turned into correct position and puts the latter tube into position around the tapered mandrel 9. Thereby any deformation of the upper end of the tube will be removed and the previous circular cross-sectional shape of the latter tube, except at the bottom portion of the tube will be changed into an oval shape corresponding to the oval shape of the mandrel 9 as shown in Fig. 5. Thereafter the elevator member 33 is lowered and, by means of its hook 79, pulls the tube off the mandrel 9. Instead thereof, the tube can be pulled off the mandrel 9 manually or by means of movable frictional means engaging the tube. Due to the relative angular positions of the pocket 2 and mandrel 9 as described heretofore the oval-shaped tube will drop or be pulled directly into the pocket 2, and then it cannot turn within the pocket as it rests within the recesses 35 of the pocket. Conveniently, the sealing device 5 is positioned and arranged relative to the conveyor pockets 2 in such manner that the previous slight flattening of the tube end performed by the mandrel 9 will be completed by the closing and sealing tongs when they collapse the tube end.

In the embodiment above described it was assumed by way of example that the tubes are turned automatically into correct angular positions with respect to designs etc. of the tubes, but we do not wish to limit our invention to such combination. If desired, the tubes may be placed manually in correct angular positions into the pockets 2. This may be effected at the station that in the embodiment now described is occupied by the turning member 4, and in such case a tube occasionally having been introduced into the pockets in an incorrect angular position can be turned manually into a correct position before it reaches the position below the mandrel 9. If means is provided for turning the tubes into correct angular positions said means can be utilized to screw a loosely applied cap 32 tightly to the tube. This may be effected by using the elevator member 6 to retain the cap 32 yieldingly when the tube is rotated by the member 4. But instead thereof, the mandrel 9 can be utilized for screwing the cap 32 tight. If the mandrel 9 is immovable, the cap 32 can be screwed tight by means of the elevator member as illustrated in Fig. 6, in which embodiment the rod 34a which carries the elevator member 33 may be rotatably journalled in bracket 36a and driven intermittently from the shaft 21 by means of arm 18a, link 85, rack 86, and gear wheel 87. Thereby the member 33 will rotate the cap 32 by friction. Instead thereof the mandrel 9 may be rotatably journalled in the frame 13 and driven from shaft 21 in a similar manner as spindle 11 through arm 17a, link 89, rack 90 and gear wheel 91. In this case the cap of the tube may be supported by frictional action from the elevator member 33, but this is not necessary as, due to the softness of the walls of the tube, the mandrel 9 can rotate within the same, so that the cap may be retained positively by the member 33.

As a rule, however, it is desirable to prevent rotation of the mandrel within the soft and tender walls of the tube. Therefore it might be convenient to make provision for pressing the walls of the tube against the mandrel. To this end blade-shaped springs 78 (Fig. 4) may be secured to the frame and urge the walls of the tube against the mandrel. The expression mandrel as used heretofore should not be construed to involve a single member only but it should also means any arrangement adapted to act in a manner equivalent to the non-circular solid mandrel. The mandrel may for instance consist of a plurality of rods that form jointly a non-circular means for changing the circular shape of the tube into a non-circular shape so as to prevent rotary movement of the tube within a conveyor pocket or another suitable tube carrier.

We claim:

1. In an apparatus having a mechanism for sealing collapsible tubes having originally a circular cross-sectional shape by flattening an end thereof, a rigid mandrel having an elongated cross-sectional shape, a tube carrier pocket having two oppositely disposed circular portions corresponding to and adapted to support the tube when having its original circular cross-sectional shape and two oppositely disposed recesses of substantially the same cross-sectional shape and relative distances from one another as the ends of the elongated cross section of said mandrel, means for moving said pocket into a position opposite to said mandrel to make said recesses of said pocket face the ends of the cross section of the mandrel, means for moving said mandrel and a circular tube in said pocket when facing said mandrel relative to each other so as to position said tube around said mandrel and thereby to change the shape of the walls of said tube to the same elongated cross-sectional shape as that of said mandrel corresponding in width and size to said recesses of said pocket, means for removing said mandrel and the shaped tube from each other when the elongated portions of the tube are positioned in alinement with said recesses of said pocket, and means for moving from said mandrel said pocket together with the shaped tube into a predetermined position relative to said sealing mechanism with respect to said recesses of said pocket.

2. In an apparatus having a mechanism for sealing collapsible tubes having originally a circular cross-sectional shape by flattening an end thereof, a rigid mandrel having non-circular cross-sectional shape, a tube carrier pocket having portions corresponding to and adapted to support the tube when having its original circular cross-sectional shape and recesses corresponding in width to outwardly projecting portions of the non-circular cross section of said mandrel, means for moving said pocket into a position relative to said mandrel to make said recesses of said pocket face said outer portions of the cross-section of said mandrel, means for moving said mandrel and a circular tube in said pocket when facing said mandrel relative to each other so as to position said tube around said mandrel and thereby to change the shape of the walls of said tube to the same non-circular cross-sectional shape as that of said mandrel corresponding in width and size to said recesses of said pocket, means of removing said mandrel and the shaped tube from each other when the elongated portions of the tube are positioned in alinement with said recesses of said pocket, and means for moving from said mandrel said pocket together with the shaped tube into a predetermined position relative to said sealing mechanism with respect to said recesses of said pocket.

BROR JOHNSON.
THOMAS FENWICK.